Feb. 8, 1966 H. E. BEST 3,234,065
METHOD OF LAMINATING PLASTIC FILM TO PLASTIC FOAM AND OF
DRAWING THE SAME, AND FOAM-FILM LAMINATES
Filed Jan. 9, 1961 2 Sheets-Sheet 1
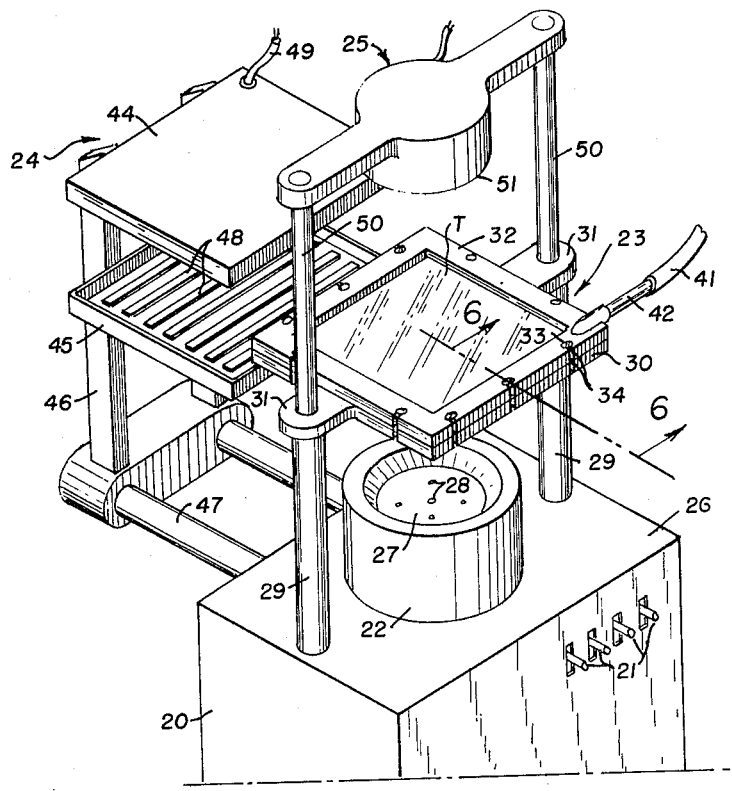
Fig. 1
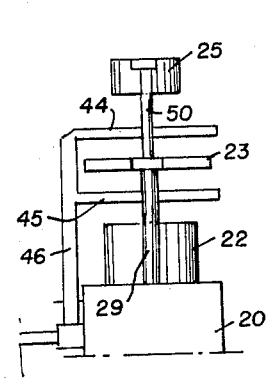 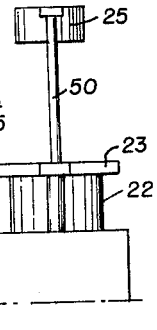 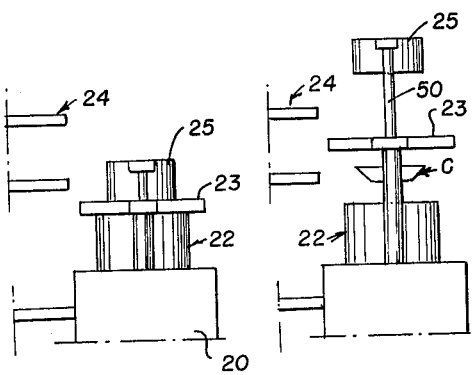
Fig. 2    Fig. 3    Fig. 4    Fig. 5
INVENTOR.
Harold E. Best
BY WHITEHEAD, VOGL & LOWE
PER Frank C. Lowe
ATTORNEYS

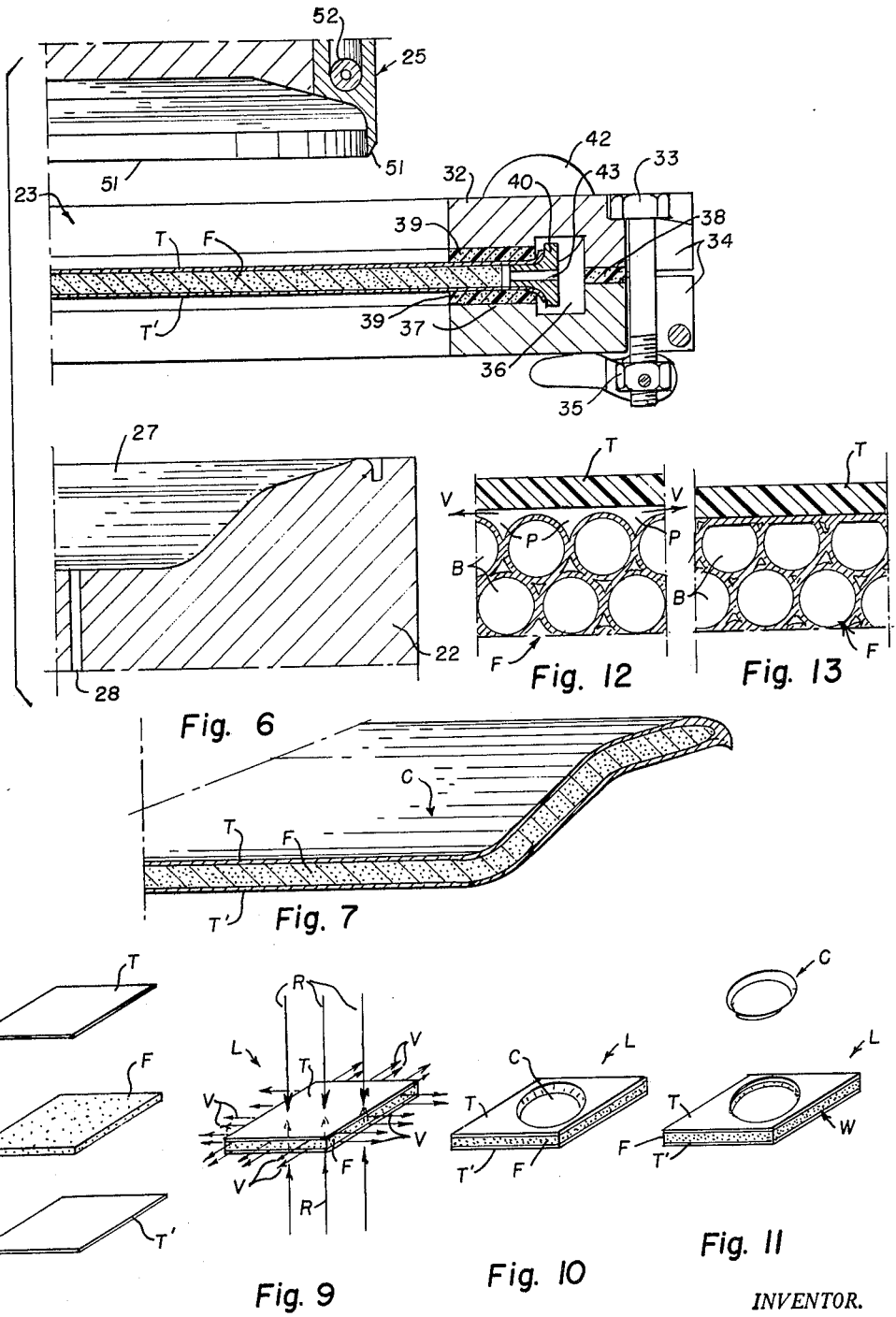

United States Patent Office 3,234,065
Patented Feb. 8, 1966

3,234,065
METHOD OF LAMINATING PLASTIC FILM TO PLASTIC FOAM AND OF DRAWING THE SAME, AND FOAM-FILM LAMINATES
Harold E. Best, Denver, Colo., assignor to Best Plastic Container Corporation, Denver, Colo., a corporation of Colorado
Filed Jan. 9, 1961, Ser. No. 81,323
2 Claims. (Cl. 156—224)

This invention relates to the fabrication and forming of thermo-plastic materials, and more particularly to the fabrication and forming of thermo-plastic synthetic resins which are commonly called "plastics" and which are commonly available as solid sheets or films and also as sheets of foamed material. The term "plastics" will be used herein to designate synthetic thermoplastic resins in accordance with common practice.

Polystyrene is one plastic which is especially suitable for fabrication and forming in accordance with the principles of the present invention because it may be easily shaped and drawn at elevated temperatures. Therefore, unless otherwise specified, the term "plastic" as herein used to describe the invention will connote polystyrene or any other plastic substance having similar properties to polystyrene, for the invention is not necessarily restricted to a particular material.

Polystyrene is available as solid transparent or translucent films of any selected thickness which are comparatively tough and strong at ordinary temperatures. It is also available as a closed-cell type foam which is a light-weight rigid material that is ideal for insulating and space-filling purposes although it lacks in strength and surface toughness. Such foam may be obtained as sheets or blocks of any selected thickness in excess of approximately one-thirty-second-inch and with any desired degree of foam density, fineness or bubble size. Hereinafter the term "film" will be used to connote polystyrene sheets of film and the term "foam" will be used to connote polystyrene sheets of foam. It will also be apparent that any skilled technician can easily select a proper type of film and foam with which to practice the invention in any given instance.

A primary object of the invention is to provide a novel and improved method for bonding, overlaying and laminating a plastic film to the surface of a sheet of plastic foam.

Another object of the invention is to provide a novel and improved method of laminating a sheet of plastic foam between two sheets of film and bonding the contacting surfaces together to obtain a final product having the desired rigidity, lightness and insulating properties of the foam with the surface toughness and strength of the film.

Another object of the invention is to provide a novel and improved method for laminating a sheet of plastic foam between sheets of plastic film and for drawing and forming the same to form a plate or like container.

Another object of the invention is to provide a novel and improved construction of a plate or a container which envelopes a core of plastic foam within a plastic film to obtain a product having the desirable lightness and insulating properties of the plastic foam and the toughness and strength of a solid plastic film at its surface.

A further object of the invention is to provide a novel and improved method of preparing a sheet of plastic foam to permit it to be formed as by a vacuum draw operation.

A further object of the invention is to provide a novel and improved method of drawing sandwiched layers of plastic materials and especially a layer of foam between two layers of film.

A further object of the invention is to provide improved modifications in conventional plastic forming equipment which permits and facilitates the drawing of sandwiched layers of plastic materials and the bonding together of the same as the drawing operation occurs.

Other objects of the invention are to provide a novel and improved method for bonding and drawing a sheet of plastic foam sandwiched between layers of film to form a container or the like which involves simple, easily performed, quick and low-cost steps, and which results in an improved, neat appearing, low cost, rugged and durable product.

With the foregoing and other objects in view, all of which more fully hereinafter appear, my invention comprises certain novel and improved operations and sequences of steps, and constructions, combinations and arrangements of parts and elements as hereinafter described, defined in the appended claims and illustrated in the accompanying drawings and diagrams in which:

FIGURE 1 is an isometric view of a conventional type of vacuum drawing apparatus which is specially modified for use with the present invention.

FIGURES 2, 3, 4 and 5 are diagrammatic elevational views of the apparatus illustrated at FIG. 1 but showing various stages of the operation of the apparatus as during a drawing operation.

FIGURE 6 is a fragmentary sectional detail of certain primary elements of the vacuum drawing apparatus, as viewed substantially from a vertical plane extending through the indicated line 6—6 at FIG. 1, but on an enlarged scale and with a sandwiched array of plastic sheets in the apparatus in position preliminary to drawing.

FIGURE 7 is a sectional portion of a container formed by the apparatus such as that illustrated at FIGS. 1 to 6.

FIGURE 8 is a diagrammatic view of selected plastic sheets arranged in inter-related positions preliminary to forming a laminated sheet according to the principles of the invention.

FIGURE 9 is a diagrammatic view of the sheet materials shown in FIG. 8 as being brought together and with arrows symbolically indicating operations upon the materials to form the laminated sheet.

FIGURE 10 is a diagrammatic view of a further operation upon the laminated sheet to draw a container from the same.

FIGURE 11 is a diagrammatic view of a final operation of separating the container from the waste material at its edges.

FIGURE 12 is a greatly enlarged sectional diagram of a fragment of plastic foam and a fragment of film to illustrate, in a somewhat symbolic manner, the general character of the materials prior to joining them together.

FIGURE 13 is a view, similar to FIG. 12, but illustrating the general character of the materials after they are joined together.

Polystyrene plastic foam is becoming a very popular product for many purposes because of its desirable properties of light weight, low thermal conductivity, impermeability and low cost. Moreover, this foam may be manufactured in a number of ways to provide various forms such as blocks, sheets, rods and the like. Also, the bubble size of the foam may be varied to provide a foam having either a coarse or a very fine texture.

A further property of polystyrene foam is that it is essentially rigid when at normal temperatures and is not rubbery as are some other types of plastic foam. Accordingly, it is well suited for many rigid articles and would be almost universally used if it were not for certain inherent disadvantages. The primary disadvantage is its low compressive strength which may not exceed sixteen to twenty pounds per square inch. This means that any greater pressure against it, such as the weight of a narrow edge, will cut into or crush the surface of the foam. Also, it is quite brittle and will easily tear. As a result of such weakness the foam cannot be used by itself for many articles of manufacture such as containers, plates and the like. When provided in sheet form, it is more suitable for use as a core material of a laminated sheet for such articles but the present methods suggested for this purpose are expensive and cumbersome and usually unworkable.

It follows that there is a real and definite need for improved methods and techniques for handling polystyrene foam and also other foams having similar properties, to produce improved articles which are made primarily of foam but which do not have the disadvantages inherent in the foam itself. Also, there is a further need for improved techniques and operations for shaping sheets of foam, as by drawing.

Polystyrene is an excellent material for drawing or shaping when at an elevated temperature, but such is not the case with foam sheets. The low compressive strength of foam is reduced to practically nothing whenever the plastic is heated to a temperature sufficiently high to work it and when so heated it will easily collapse or break apart. Because of this, plastic foam is generally considered as a material which is unsuitable for most drawing or shaping operations.

With these considerations in view, the present invention was conceived and developed, and the invention comprises, in essence, a method for laminating, working and drawing a sheet of plastic foam between sheets of plastic film into flat laminated sheets or other various shaped articles such as containers and to thereby produce an improved product and improved articles which are characterized by having a foam core between tough and hard surface films.

The first phase of the invention concerns laminating of a sheet of plastic foam core between sheets of film. To produce a satisfactory laminate the sheets of film must be bonded, to some degree, to the foam core and it would seem that it is essential that the film and foam be of the same plastic substance. While such is preferable, it was also discovered that bonding would occur between polystyrene foam and films of other plastic families such as acetates, vinyls and polyethylenes. Obviously, such bonding was of a mechanical nature, but it was observed that even though the plastic materials were normally incompatible and would not normally weld together, the films gripped the foam so tightly that fragments of foam were pulled apart when the films were separated from the foam. It is to be noted that the thickness of the plastic sheets of foam are ordinarily not less than one-thirty-second-inch and while the invention is not restricted to foam sheets of any specific thickness, sheets having a thickness of one-sixteenth to one-fourth of an inch are preferred.

The essential steps of this operation are represented symbolically by FIGS. 8 and 9. FIG. 8 represents a sheet of foam F positioned between two thinner sheets of transparent or transluscent films T and T' before the sheets are brought together. The sheets F, T and T' are represented as simple rectangles such as may be prepared for use in a rectangular clamping frame of a single-draw unit as hereinafter described. However, it is to be understood that the operation of laminating is possible with a continuous material supply such as that which might be obtained by extruding a sheet of foam and unreeling a roll of film at each side of the foam, and that the present invention is not to be restricted to the laminating of small individual sheets as illustrated.

To commence the process, the sheets F, T and T' are brought together and are restrained at their peripheral edges by any suitable means such as a clamp frame or rolls if the operation is of a continuous type. This restraining is necessary to hold the sheets flat and plane against warping actions which occur when the sheets are heated, a characteristic of plastic sheets and especially polystyrene sheets. When so held and restrained as in the sandwich form illustrated at FIG. 9, the air is evacuated from the contacting surfaces between the foam and film, the arrows V, indicating this evacuation action.

In a closed cell plastic foam F this action pulls the film sheets T and T' tightly against the foam but it does not create compressive stresses within the foam inself. This is illustrated at FIGS. 12 and 13. A greatly enlarged fragment of foam F is formed as a myriad of bubbles B with the plastic forming the individual closed cells of the foam. The surface is naturally irregular and when the film T lies against this surface a substantial number of air pockets P exist. Evacuation of the air from these pockets between the surface of the foam F and the film T as indicated by the arrows V tends to pull the film tightly against the foam and will ultimately crush the outer walls of the boundary cells or bubbles B, especially when the foam is heated. Nevertheless, this ultimate action, indicated in FIG. 13 will not effect the air pressure within the closed cell bubbles B and consequently the evacuation of air between the surfaces will not produce a crushing stress upon the foam material even when it is heated to molding temperatures and has practically no compressive strength.

The next step in the process is to heat the films and the foam to a drawing temperature with the contacting surfaces of the foam and film being at a welding temperature to change the sandwich of sheets to a laminate. This complex heating operation is accomplished by a carefully controlled radiation type heating indicated by arrows R at FIG. 9, which can best be determined by experimental timing of a skilled operator. It is known that if a sheet of plastic is heated, it will first warp and sag due to normal thermal expansion of the material, and that when it reaches the drawing temperature, the sheet will then contract due to a molecular interaction similar to the "plastic memory" phenomenon. This is the reason for the need for restraining the sheets as heretofore stated. For polystyrene, the drawing temperature ranges from 285 to 320 degrees F. and other similar plastics have similar drawing temperatures. At a higher temperature, the plastic commences to melt and the plastic can be welded, the welding temperature being from 320 to 365 degrees F., depending upon the particular formulation of the plastic material.

As heretofore stated, the films T and T' must apparently be transparent or transluscent or at least transluscent to infrared or heat waves and the foam transluscent so that when thermal radiation R is applied, a substantial part of the radiation will pass through the films and be absorbed by the foam. A balance of heat absorption to bring both the foam and films to a drawing temperature at the same time can be obtained by proper balance of the radiant heat intensity and the time of exposure will depend upon the comparative thickness of the film and foam. At the same time, these sheets cannot be heated to the welding temperature or they will collapse or commence to melt; nevertheless, it was discovered that the contacting surfaces can be brought together and welded. Evidently a higher welding temperature exists at the contact surfaces, at least for an instant and for a period sufficient to effect welding. Apparently the unwelded contacting surfaces form an optical discontinuity where an excess of thermal radiation is absorbed until they weld together. To emphasize this action, the transparent films T and T' may be provided with a transluscent contacting surface.

The steps thus described are essentially a process of preparing a laminated sheet and the laminate L may be allowed to cool as a final product. This thus provides a sheet of foam having a tough film overlay and a final product which does not have the objectionable features of uncoated plastic foam.

The primary utility of the laminated foam is for drawing it into various articles and especially containers. Sheets of foam may be laminated and stored for this purpose, but the preferred operation is to form an article, as by drawing, at the same time as the lamination occurs because the sheets are then properly heated and stretched for a drawing operation. FIGURES 10 and 11 thus represent, symbolically, further steps of my method where the laminate L, which consists of the sheets of foam F and films T and T' are drawn and finished to form a container C. FIG. 10 represents the drawing operation and FIG. 11 represents the trimming operation where scrap or waste material W is trimmed from the edge of the container for disposal.

It was discovered that certain limitations existed in the operational drawing of the laminate. In the first place it was ascertained that the foam does not effectively resist compression and vacuum drawing appears to be the preferred operation. It was further discovered that vacuum intensity or subatmospheric pressure of the draw had to be controlled to prevent the film surface T' at the face of the laminate in the direction of the draw from being pulled away from the foam core. When the vacuum pull of the drawing apparatus exceeded the intensity of vacuum between the layer of film T' and foam F or exceeded the strength of the plastic forming the bubbles B, separation could occur. The controlling factors are not at present fully understood, but for a given foam density and diameter of draw and selected draw speed or time, the thickness of the film T' must not exceed a definite critical thickness. This can best be determined by experiment by a skilled operator.

A further, final operation of the process was to cut out the container C from the laminate and the waste material or scrap remaining of the sheet of film about the portion forming the draw. A simple cutting and sealing operation, or heat seal operation by a heated peripheral type cutting die was found to suffice in this operation.

The apparatus depicted at FIGS. 1 through 6 is illustrative of apparatus which may be used to practice the improved process to obtain a laminate L and a container C by drawing the laminate. The apparatus is a conventional type of a vacuum drawing machine which is adapted for simple drawing operations in a single mold, and which is appropriately modified to form and draw the laminate L as now set forth.

The apparatus is formed upon a box-like case 20 which contains suitable operative mechanisms, not shown, to actuate the apparatus as hereinafter described and suitable control levers 21 are provided at the side of the frame at a convenient position for an operator. The illustrated mechanisms and parts carried upon the machine include, a draw mold 22, a clamp frame 23, a heating element 24 and a trimming die 25. All of these mechanisms and parts are essentially conventional and are operated in a conventional manner with the primary modifications being in the clamp frame 23 and heating element 25 as hereinafter described in detail.

The top surface of the base 20 forms a horizontally disposed platen 26 whereon the draw mold 22 is mounted with its mold cavity 27 being substantially at the center of the platen. This cavity 27 may be of any suitable form such as the dish-like container-form illustrated, and a suitable array of passages 28 extend from the bottom of the mold cavity to the platen to connect with a passage in the platen, not shown, which in turn connects with a standard type of vacuum producing mechanism within the base 20, also not shown. This mechanism is operated by a control lever 21.

The horizontally disposed clamp frame 23 which holds the sandwich of plastic sheets T, F and T' is mounted upon and between two posts 29 which upstand from the base 20. These posts are retractable into the base to move the clamp frame 23 downwardly from an initial position above the mold 22 and to the mold to draw the laminate L over the top of the mold. This downward movement, and a return movement to the initial position is controlled by a shifting lever 21.

The clamp frame 23 is preferably rectangular or square and for sheets of film and foam of a specified size. The frame includes two flat members, a lower supporting member 30 which is attached to the posts 29 as by outstanding ears 31 and a upper holding member 32 which lies upon the supporting member to hold the film between the members. The upper member is clamped to the frame in any suitable manner as by bolts 33 which are mounted in matching slots 34. The slots are preferably arranged so that the bolts can be quickly positioned in them and the bolts may include suitable toggle-levered nuts 35, as illustrated at FIG. 6, to facilitate quick changing and locking of the frame.

This clamp frame is modified from conventional types of frames which simply grip the edge of a plastic sheet, by including a continuous pocket 36 between the supporting and holding members 30 and 32 and further, by a spaced gap 37 at the inner side of the frame members to accommodate the comparatively thick edges of the film and foam sandwich which is to be laminated and drawn. A resilient gasket 38 is positioned about the frame between the members 30 and 32 and outwardly of the pocket 36 to provide for an air tight joint between the members. Gaskets 39 are positioned on the members 30 and 32 at each side of the spaced gap 37 to provide for resilient gripping of the film and foam sandwich as in the manner clearly illustrated at FIG. 6.

In the construction disclosed, it is contemplated that the rectangular sheet of foam F will be smaller in size than the rectangular sheets of film T and T' and that the edges of the films will lie completely within the gap 37 and extend substantially to or into the pocket 36, but that the edge of the foam rectangle F will set only partially within the gap. A rectangular spacer 40 is adapted to fit the portion of the gap adjacent to the pocket to lie between the portions of film extending beyond the edge of the foam, as illustrated at FIG. 6, and to hold the edges of the films against the gaskets 39.

A vacuum line 41 extends to a pipe stub 42 at a convenient corner of the clamp frame 24 and the stub communicates with the pocket 36. This vacuum line thereby creates a vacuum in the pocket 36, and the spacer includes a series of cross passages 43 to provide communication between the pocket 36 and the spaces between the films T and T' and foam F. It follows that when the sandwich of film and foam is placed between the clamp frame and a vacuum is created in the pocket 36, the air is effectively evacuated from between the contacting surfaces of the film and foam and the edges of the film foam are effectively restrained to permit heating and drawing operations to proceed as in the manner heretofore described.

The heating element 24 includes a pair of horizontally disposed pans, an upper pan 44 which faces downwardly and a lower pan 45 which faces upwardly. These pans are mounted upon a suitable framework 46 which, in turn, is carried upon horizontally disposed slide members 47 which outstand from the base 20. The heating pans are normally positioned at one side of the base 20 but are adapted to move upon the slide members 47 to extend above and below the clamp frame 23 when the clamp frame is in its aforesaid initial poistion above the mold. This movement is controlled by a suitable lever 21 and may be automatically timed to move the pans over and underneath the clamp frame for a selected time interval, sufficient to properly heat the plastic sheets in the frame and to then retract to its position at the side of the base. An array of heat-radiating rods 48 are positioned in each pan and circuit leads 49 are provided to connect with a proper power source to effect the heating of the rods 48 in a conventional manner.

The trim die 25 is mounted upon a pair of vertical posts 50 which are illustrated as being telescoped within the frame-supporting posts 29, and the trim die is disposed directly over the frame 23 for downward movement upon the frame when it is over the mold cavity and after the drawing operation is completed. Therefore, the posts 50 are retractable into the base from their initial position above the other apparatus and the movement is controlled by a suitable lever 21, and in a conventional manner. This die includes a heat-sealing lip 51 which is formed to correspond with the edge of the mold cavity 27 and a heating element 52 in this lip to bring it to a proper heat-sealing-cut-off temperature.

The general operation of this apparatus is illustrated at FIGS. 2 through 5. After the clamp frame 23 is loaded with a sandwich of film and foam and the pocket 36 within the frame is exacuated, the pans 44 and 45 are moved over and under the clamp frame as at FIG. 2. This operation is suitably timed to bring the film and foam to a proper temperature for drawing and sealing the foam to the film. If a flat laminate L is desired, such completes the operation and the pans 44 and 45 are retracted and the laminate permitted to cool before being removed from the frame.

However, if drawing is desired, the clamp frame 23 is moved downwardly and with the plastic sheets being against the top of the mold 22 as at FIG. 3. The mold cavity is then evacuated and the drawing action occurs. The next operation is to bring the trim die downwardly to trim and simultaneously heat seal the container being formed within the mold cavity. The final operation is to retract the trim die and clamp frame to their initial positions above the mold cavity, and after the container is formed within it is sufficiently cooled, to reverse the air pressure within the cavity and eject the container, as indicated at FIG. 5.

While I have now described my invention in considerable detail, it is apparent that others skilled in the art can devise other alternate and equivalent steps and operations and can build alternate and equivalent construction all of which are within the spirit and scope of my invention. Hence I desire that my protection be limited not by the constructions illustrated and described but only by the proper scope of the appended claims.

I claim:

1. A method of forming a drawn hollow container-like article comprising the steps of:

(a) first, placing sheets of continuous imperforate heat-permeable, thermo-plastic synthetic film in overlying and underlying to an imperforate substantially flat closed cell thermo-plastic synthetic resin foam sheet and restraining the preiphery of the sandwich of film and foam sheets formed thereby;

(b) second, through application of a partial positive vacuum evacuating the interfaces between the flat surfaces of said sheets to cause said film sheets to move in contacting pressure engagement with the surfaces of said foam sheet across the interfaces therebetween;

(c) thereafter, while maintaining said positive partial vacuum, directing radiant heat onto and through said sheets of plastic film throughout said interfaces in sufficient amount to simultaneously raise the temperature of the foam sheet surfaces and the overlying contacting surfaces of said film sheets sufficiently to automatically create a bond therebetween throughout said interfaces and to a point where the film sheets and foam sheet may be simultaneously drawn to the hollow shape; and, (d) while still maintaining said positive partial vacuum, establishing a differential gas pressure between opposite major faces of said sandwich, and by means of said differential gas pressure, drawing the bonded sheets to the final hollow shape.

2. The method defined in claim 1 including the further step of trimming the edges of the article by application of heat and pressure along the trim edge sufficient to cut and simultaneously seal the edges.

References Cited by the Examiner

UNITED STATES PATENTS

| | | | |
|---|---|---|---|
| 2,367,670 | 1/1945 | Christ | 156—272 |
| 2,493,439 | 1/1950 | Braund | 18—56 |
| 2,806,812 | 9/1957 | Merz. | |
| 2,828,799 | 4/1958 | Harrison | 156—84 |
| 2,893,877 | 7/1959 | Nickolls. | |

FOREIGN PATENTS

| | | |
|---|---|---|
| 567,776 | 3/1945 | Great Britain. |

EARL M. BERGERT, *Primary Examiner.*

CARL F. KRAFFT, *Examiner.*